(12) United States Patent
Fuelberth et al.

(10) Patent No.: US 7,661,410 B1
(45) Date of Patent: Feb. 16, 2010

(54) FLUID LEAK LIMITER

(75) Inventors: David L. Fuelberth, Dunlap, IL (US);
Daniel Richard Ibrahim, Metamora, IL (US); Alan Ray Stockner, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/222,846

(22) Filed: Aug. 18, 2008

(51) Int. Cl.
*F02M 59/46* (2006.01)
*F02M 63/02* (2006.01)

(52) U.S. Cl. ............ 123/467; 123/198 D; 123/198 DB

(58) Field of Classification Search .................. 123/467, 123/510, 511, 198 D, 198 DB; 137/498, 137/500, 517, 460
See application file for complete search history.

(56) References Cited

U.S. PATENT DOCUMENTS

| | | | | |
|---|---|---|---|---|
| 2,656,850 A | * | 10/1953 | Garretson | 137/460 |
| 3,575,204 A | * | 4/1971 | McMurry | 137/498 |
| 3,710,822 A | * | 1/1973 | Lyda | 137/549 |
| 3,766,940 A | * | 10/1973 | Mason | 137/460 |
| 3,780,716 A | * | 12/1973 | Fenne | 123/447 |
| 3,880,398 A | * | 4/1975 | Rubrich | 251/16 |
| 3,977,430 A | * | 8/1976 | Bushee | 137/460 |
| 4,128,105 A | * | 12/1978 | Follett | 137/1 |
| 4,195,658 A | * | 4/1980 | Dierksmeier et al. | 137/462 |
| 4,269,223 A | * | 5/1981 | Carter et al. | 137/460 |
| 4,349,042 A | * | 9/1982 | Shimizu | 137/39 |
| 4,436,111 A | * | 3/1984 | Gold et al. | 137/498 |
| 4,589,393 A | * | 5/1986 | Jourde et al. | 123/460 |
| 4,590,962 A | * | 5/1986 | Tespa | 137/498 |
| 4,798,186 A | | 1/1989 | Ganser | |
| 4,842,198 A | * | 6/1989 | Chang | 239/200 |
| 5,209,204 A | | 5/1993 | Bodenhausen et al. | |
| 5,433,182 A | * | 7/1995 | Augustin et al. | 123/456 |
| 5,551,403 A | * | 9/1996 | Schmidt | 123/510 |
| 5,577,479 A | * | 11/1996 | Popp | 123/458 |
| 5,692,476 A | * | 12/1997 | Egler et al. | 123/456 |
| 5,868,111 A | * | 2/1999 | Augustin | 123/198 D |
| 6,109,542 A | | 8/2000 | Morris et al. | |
| 6,244,253 B1 | | 6/2001 | Haeberer et al. | |
| 6,293,254 B1 | | 9/2001 | Crofts et al. | |
| 6,302,333 B1 | | 10/2001 | Hoffmann et al. | |
| 6,314,936 B1 | | 11/2001 | Angström | |
| 6,357,415 B1 | * | 3/2002 | Mori | 123/198 DB |

(Continued)

FOREIGN PATENT DOCUMENTS

EP    1270931    1/2006

(Continued)

*Primary Examiner*—Thomas N Moulis
(74) *Attorney, Agent, or Firm*—Finnegan, Henderson, Farabow, Garrett & Dunner; Carl E. Myers

(57) ABSTRACT

A fluid leak limiter for a high-pressure fuel injection system is disclosed. The fluid leak limiter may have a body at least partially defining a central bore and having a fluid inlet and a fluid outlet, a piston reciprocatingly disposed within the central bore, and a spring located to bias the piston toward a first flow-blocking position at which fluid from the fluid inlet is inhibited from flowing to the fluid outlet. The fluid leak limiter may also have a pin configured to selectively lock the piston in a second flow-blocking position at which fluid from the fluid inlet is inhibited from flowing to the fluid outlet.

21 Claims, 3 Drawing Sheets

U.S. PATENT DOCUMENTS

| | | |
|---|---|---|
| 6,374,806 B1 | 4/2002 | Keeley et al. |
| 6,405,941 B2 | 6/2002 | Ganser |
| 6,705,292 B2 | 3/2004 | Bugos |
| 6,805,302 B2 | 10/2004 | Boecking |
| 6,840,268 B2 * | 1/2005 | Kennedy et al. ............ 137/504 |
| 6,918,379 B2 * | 7/2005 | Reischl et al. .............. 123/480 |
| 7,028,918 B2 | 4/2006 | Buchanan et al. |
| 7,309,027 B2 | 12/2007 | Magel et al. |
| 7,428,893 B2 * | 9/2008 | Shinogle et al. ............. 123/481 |
| 2003/0183200 A1 | 10/2003 | Bugos |
| 2006/0191515 A1 | 8/2006 | Savage, Jr. et al. |
| 2007/0169751 A1 | 7/2007 | Tominaga et al. |
| 2008/0156290 A1 | 7/2008 | Ochiai |

FOREIGN PATENT DOCUMENTS

| | | |
|---|---|---|
| EP | 1633974 | 8/2007 |

* cited by examiner

FLUID LEAK LIMITER

TECHNICAL FIELD

The present disclosure is directed to a fluid leak limiter and, more particularly, to a fluid leak limiter for use with a high-pressure fuel injection system.

BACKGROUND

High-pressure fuel injection systems typically employ closed-nozzle fuel injectors to inject high-pressure fuel into the combustion chambers of an engine. Each of these fuel injectors includes a nozzle member having a cylindrical bore with a nozzle supply passageway and a nozzle outlet. A needle check valve is reciprocatingly disposed within the cylindrical bore and biased toward a closed position, at which the nozzle outlet is blocked. In response to an injection request, the needle check valve is selectively moved to open the nozzle outlet, thereby allowing high-pressure fuel to flow from the nozzle supply passageway into an associated combustion chamber.

During operation of the fuel injector, it may be possible for a tip portion of the nozzle member to crack, erode, or completely break away, leaving the nozzle outlet continuously open to some degree. In order to ensure the high-pressure fuel is not constantly pumped into the combustion chamber of the engine, some high-pressure fuel injection systems employ a leak limiter to limit fuel leakage through the nozzle member during an injector failure.

Existing leak limiters are configured to block fuel flow to the tip portion of a leaking injector after failure of the injector. Although effective, upon shutdown of the engine, existing leak limiters automatically reset each time and, during restart of the engine, fuel is once again continuously pumped through the leaking injector into the combustion chamber. In some instances, the leakage could be so significant that pressure cannot build within the fuel system during restart, thereby inhibiting further operation of the engine. If unaccounted for, this situation could leave a machine stranded and/or inhibit diagnosis of the leaking injector.

One leak limiter configured to permanently inhibit fuel leakage through a failed injector is described in U.S. Patent Publication No. 2006/0191515 (the '515 publication) by Savage, Jr. et al. published Aug. 31, 2006. The '515 publication discloses a fuel injector having a needle valve member disposed within and supported by a tip portion of a nozzle member. During normal operation, the needle valve member is moved away from the tip portion of the nozzle member to allow pressurized fuel to exit the fuel injector by way of a nozzle outlet located at the tip portion. Upon breakage of the tip portion, the needle valve member is no longer supported and descends into the nozzle member under the bias of a spring until an outer conical seating surface of the needle valve member engages an inner conical seating surface of the nozzle member, thereby isolating the outlet at the tip portion from pressurized fuel. Geometry of the needle valve member inhibits further movement that would re-communicate the outlet at the tip portion of the nozzle member with the pressurized fuel, even during subsequent intentional injection events and during engine restart.

Although the leak limiter of the '515 publication may permanently inhibit fuel leakage of a failed injector after the tip end of the nozzle member has broken away, it may still be sub-optimal. That is, during some fuel injector failure modes, for example cracking or erosion, the tip portion may not break away enough for the needle check valve to sufficiently descend and completely block undesired fuel leakage through the nozzle member. In these situations, some fuel leakage may still occur. And, there may be some situations where it is desirable to selectively reset and reuse the leak limiter.

The fuel leak limiter of the present disclosure solves one or more of the problems set forth above and/or other problems of the prior art.

SUMMARY

One aspect of the present disclosure is directed to a fluid leak limiter. The fluid leak limiter may include a body at least partially defining a central bore and having a fluid inlet and a fluid outlet, a piston reciprocatingly disposed within the central bore, and a spring located to bias the piston toward a first flow-blocking position at which fluid from the fluid inlet is inhibited from flowing to the fluid outlet. The fluid leak limiter may also include a pin configured to selectively lock the piston in a second flow-blocking position at which fluid from the fluid inlet is inhibited from flowing to the fluid outlet.

Another aspect of the present disclosure is directed to another fluid leak limiter. This fluid leak limiter may include a body at least partially defining a central bore and having a fluid inlet and a fluid outlet, a piston reciprocatingly disposed within the central bore, and a spring located to bias the piston toward a first flow-blocking position at which fluid from the fluid inlet is inhibited from flowing to the fluid outlet. The fluid leak limiter may also include an electronic locking actuator configured to lock the piston in a second flow-blocking position at which fluid from the fluid inlet is inhibited from flowing to the fluid outlet and to generate a signal indicative of a locked status of the piston.

In yet another aspect, the present disclosure is directed to a fuel system. The fuel system may include a pump configured to pressurize fuel, a fuel injector configured to receive pressurized fuel from the pump, and a resettable leak limiter situated between the pump and the fuel injector. The resettable leak limiter may be configured to inhibit fuel flow from the pump to the fuel injector after the fuel injector has been compromised.

DETAILED DESCRIPTION

Figure 1:
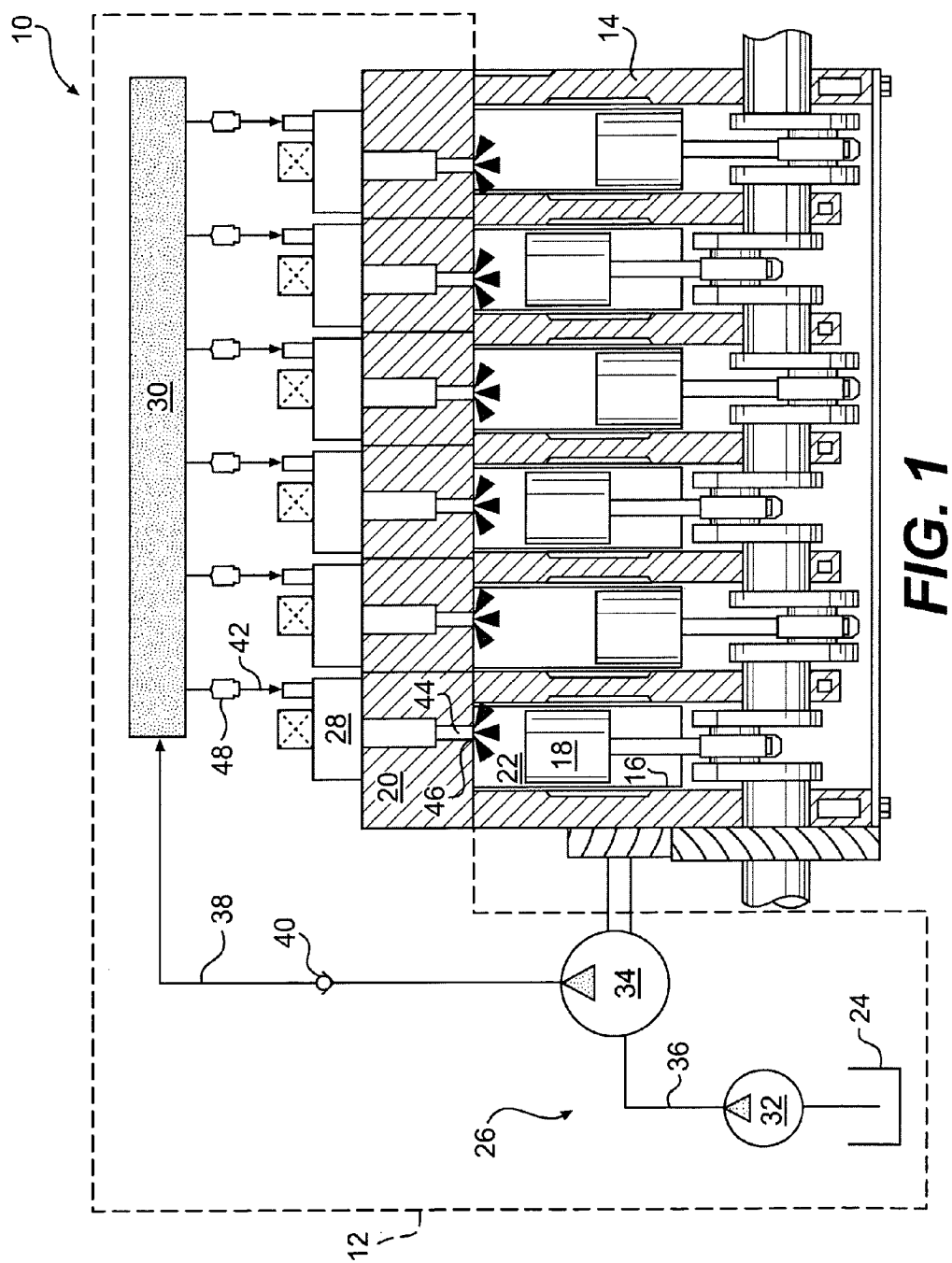
FIG. 1 is a schematic and diagrammatic illustration of an exemplary disclosed power system.

An exemplary embodiment of an engine 10 having a fuel system 12 is illustrated in FIG. 1. For the purposes of this disclosure, engine 10 is depicted and described as a four-stroke diesel engine. One skilled in the art will recognize, however, that engine 10 may be any other type of internal combustion engine such as, for example, a gasoline or a gaseous fuel-powered engine. Engine 10 may include an engine block 14 that at least partially defines a plurality of cylinders 16, a piston 18 slidably disposed within each cylinder 16, and a cylinder head 20 associated with each cylinder 16.

Cylinder 16, piston 18, and cylinder head 20 may together form a combustion chamber 22. In the illustrated embodiment, engine 10 includes six combustion chambers 22. However, it is contemplated that engine 10 may include a greater or lesser number of combustion chambers 22 and that combustion chambers 22 may be disposed in an "in-line" configuration, a "V" configuration, or in any other suitable configuration.

Fuel system 12 may include components that cooperate to deliver injections of pressurized fuel into each combustion chamber 22. Specifically, fuel system 12 may include a tank 24 configured to hold a supply of fuel, and a fuel pumping arrangement 26 configured to pressurize the fuel and direct the pressurized fuel to a plurality of fuel injectors 28 by way of a common manifold or rail 30. It is contemplated, however, that in some embodiments, manifold 30 may be omitted or integral with fuel pumping arrangement 26, if desired.

Fuel pumping arrangement 26 may include one or more pumping devices that function to increase the pressure of the fuel and direct one or more pressurized streams of fuel to manifold 30. In one example, fuel pumping arrangement 26 includes a low pressure source 32 and a high-pressure source 34 disposed in series and fluidly connected by way of a fuel line 36. Low pressure source 32 may be a transfer pump configured to provide low pressure feed to high-pressure source 34. High-pressure source 34 may be configured to receive the low pressure feed and increase the pressure of the fuel to, in some embodiments, about 330 MPa. High-pressure source 34 may be connected to manifold 30 by way of a fuel line 38. A check valve 40 may be disposed within fuel line 38 to provide for a unidirectional flow of fuel from fuel pumping arrangement 26 to manifold 30.

Fuel injectors 28 may be disposed within cylinder heads 20 and connected to manifold 30 by way of a plurality of fuel lines 42. Each fuel injector 28 may be operable to inject an amount of pressurized fuel into an associated combustion chamber 22 at predetermined timings, fuel pressures, and fuel flow rates. Fuel injectors 28 may be hydraulically, mechanically, electrically, or pneumatically operated.

Each fuel injector 28 may be a closed nozzle unit fuel injector having a nozzle member 44. Nozzle member 44 may embody a generally cylindrical member configured to receive a needle valve (not shown). One or more orifices 46 may be located at a tip end of nozzle member 44 and selectively blocked and unblocked by the needle valve to allow injections of pressurized fuel into combustion chamber 22.

In some situations, it may be possible for a portion of nozzle member 44 to erode, crack, or completely break away. In order to inhibit unchecked fuel leakage from the damaged nozzle member 44 into combustion chamber 22, a fluid leak limiter 48 may be fluidly disposed between manifold 30 and each fuel injector 28. In one embodiment, fluid leak limiter 48 may be directly connected to manifold 30 by threaded fastening, for example, and indirectly connected to fuel injector 28. In some applications, fluid leak limiter 48 may designed to pass about 15-20 l/min of fuel at a pressure of about 180 MPa during an injection event.

Fluid leak limiter 48 may be configured to inhibit fuel flow to a leaking fuel injector 28 in response to a pressure differential between manifold 30 and the leaking fuel injector 28, and in response to a duration of the pressure differential. That is, when the integrity of nozzle member 44 is compromised (e.g., when nozzle member 44 at least partially fails due to erosion, cracking, or breaking, for example), fuel within the compromised fuel injector 28 may flow substantially unimpeded into the associated combustion chamber 22 for a duration longer than normal injection events. In one example, a normal injection duration may be 4-6 ms. As a result of this decreased restriction to flow within the compromised fuel injector 28, the pressure of the fuel within the compromised fuel injector 28 may quickly be reduced by a significant amount and remain reduced for as long as fuel is leaking through the failed injector. This increased injection duration (i.e., the increased amount of time during which the pressure differential across fluid leak limiter 48 exists), as will be described in more detail below, may cause fluid leak limiter 48 to actuate and inhibit fuel flow to the compromised fuel injector 28. Once fluid leak limiter 48 has actuated, fuel flow through fluid leak limiter 48 may be substantially inhibited until fluid leak limiter 48 is manually or electrically reset. That is, fluid leak limiter 48 may be a latching-type limiter, wherein fuel flow therethrough may be inhibited until service has been performed.

Figure 2:
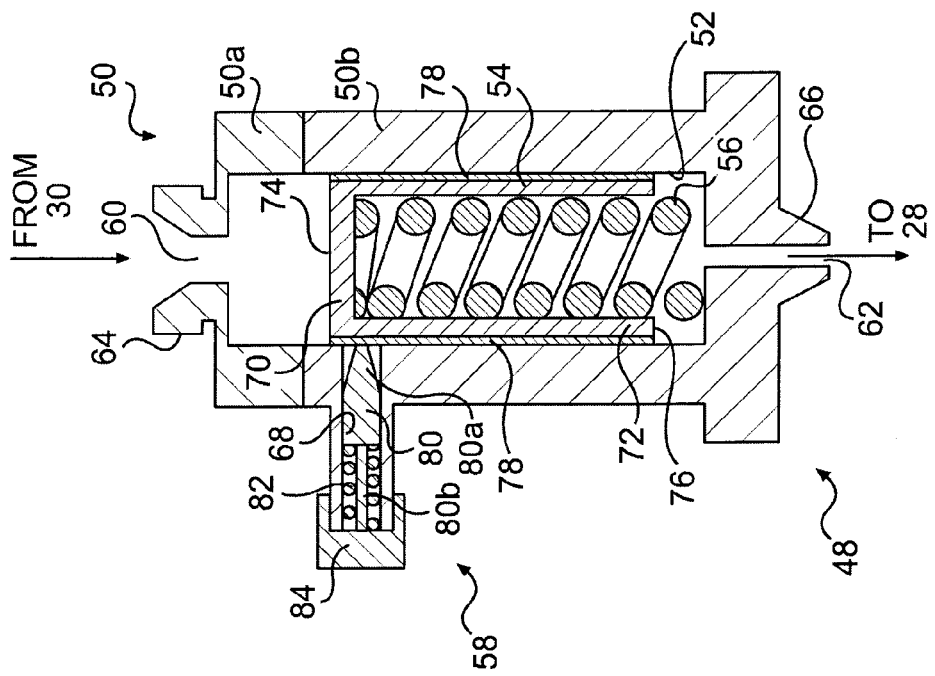
FIG. 2 is a cross-sectional illustration of an exemplary disclosed fuel leak limiter that may be used with the power system of FIG. 1 and shown in a first position.

As illustrated in FIG. 2, fluid leak limiter 48 may include multiple components that cooperate to selectively pass or block fuel flow in response to a pressure differential. Specifically, fluid leak limiter 48 may include a body 50 that at least partially encloses a central bore 52, a piston 54 reciprocatingly disposed within central bore 52 and biased toward a first flow-blocking position shown in FIG. 2 by a spring 56, and a locking actuator 58 that locks piston 54 in a second flow-blocking position shown in FIG. 4.

Body 50 may be a two-piece member having a fluid inlet 60 and a fluid outlet 62. In particular, body 50 may include a first body member 50a and a second body member 50b threadingly received within an open end of first body member 50a. First body member 50a may have a male sealing surface 64 configured to engage a female seating surface (not shown) of manifold 30, while second body member 50b may have a male sealing surface 66 configured to engage fuel injector 28 or a fuel conduit connected to fuel injector 28. Fluid inlet 60 may be disposed within first body member 50a in axial alignment and fluid communication with central bore 52. Fluid outlet 62 may be disposed within second body member 50b in axial alignment and fluid communication with central bore 52. A recess 68 may be located within an annular side wall of second body member 50b near an interface of first and second body members 50a, 50b (i.e., a distance away from outlet 62 about equal to an axial length of piston 54) to receive a portion of locking actuator 58.

Piston 54 may have a generally cup-like shape, with a closed end 70 and an opposing open end 72 (i.e., piston 54 may be a sleeve type piston). In one example, a diameter piston 54 may be about 16 mm, such that an area of closed end 70 may be about 200 mm². A first sealing surface 74 may be located at closed end 70 and configured to engage an end surface of central bore 52 to selectively inhibit a flow of fuel from fluid inlet 60 to central bore 52 when piston 54 is in the first flow-blocking position (FIG. 2). A second sealing surface 76 may be located at open end 72 and configured to engage an opposing end surface of central bore 52 to selectively inhibit a flow of fuel from central bore 52 to fluid outlet 62 when piston 54 is in the second flow-blocking position (FIG. 4). One or more grooves 78 may be located in an outer surface of piston 54 and axially extend from about first sealing surface 74 to about second sealing surface 76 to facilitate a flow of fuel from fluid inlet 60 to fluid outlet 62 when piston 54 is in a flow-passing position shown in FIG. 3. The flow-passing position may be between the first and second flow-blocking positions, where first and second sealing surfaces 74, 76 are away from the end surfaces of central bore 52.

Spring 56 may include a first end located within second body member 50*b*, and a second end located within piston 54 to bias first sealing surface 74 against the end of central bore 52, thereby blocking the flow of fuel from fluid inlet 60 into central bore 52. As fuel from fluid inlet 60 presses against closed end 70 of piston 54 and fuel from within central bore 52 is consumed by an associated fuel injector 28, a pressure differential across piston 54 may generate a force on piston 54 that causes spring 56 to compress. In one example, a preload of spring 56 may be about 75 N, a spring rate of spring 56 may be about 5.5 N/mm, and a stroke length of spring 56 may be about 6 mm. And, when piston 54 is exposed to a pressure differential of about 0.375-0.54 MPa and spring 56 compresses, piston 54 may be allowed to move away from the first flow-blocking position (FIG. 2) toward the flow-passing position (FIG. 3) as long as the pressure differential exists within central bore 52. In the flow-passing position, pressurized fuel from within manifold 30 may be allowed to flow substantially unimpeded through fluid leak limiter 48 by way of grooves 78 to fuel injector 28. However, in the event of an injector failure, the pressure of the fuel within fuel injector 28, fluid outlet 62, and central bore 52 may be reduced and remain low for an extended period of time (i.e., until the failed injector is no longer leaking fuel), thereby creating a pressure differential across piston 54 that urges piston 54 against the bias of spring 56. And, because of the duration of the pressure differential across piston 54, spring 56 may have sufficient time to compress piston 54 far enough toward second body member 50*b* that locking actuator 58 actuates to lock piston 54 in the second flow-blocking position (FIG. 4).

Figure 3:
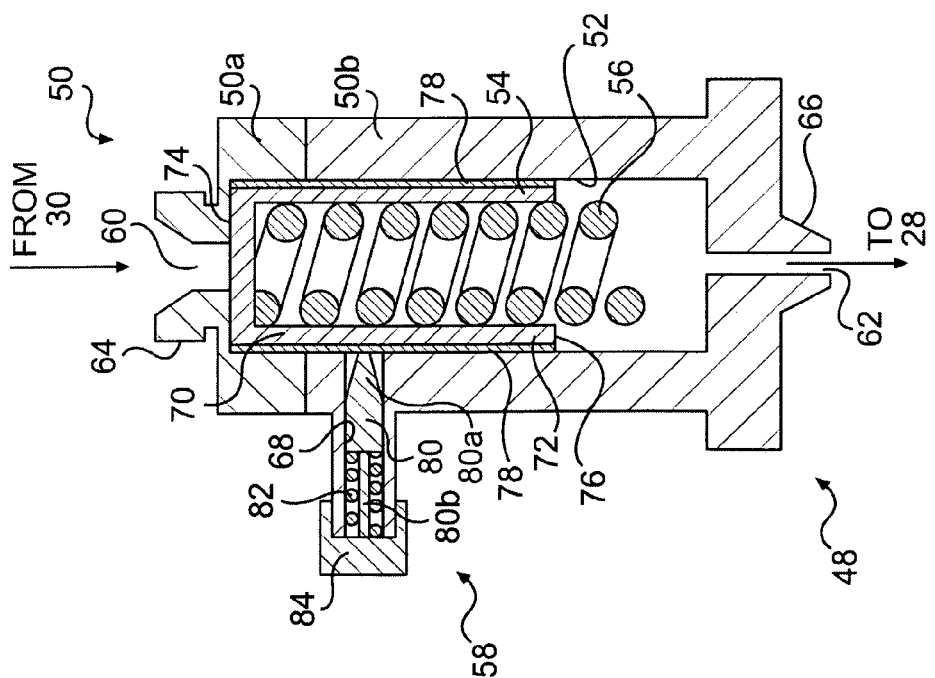
FIG. 3 is a cross-sectional illustration of the fuel leak limiter of FIG. 2 shown in a second position.
Figure 4:
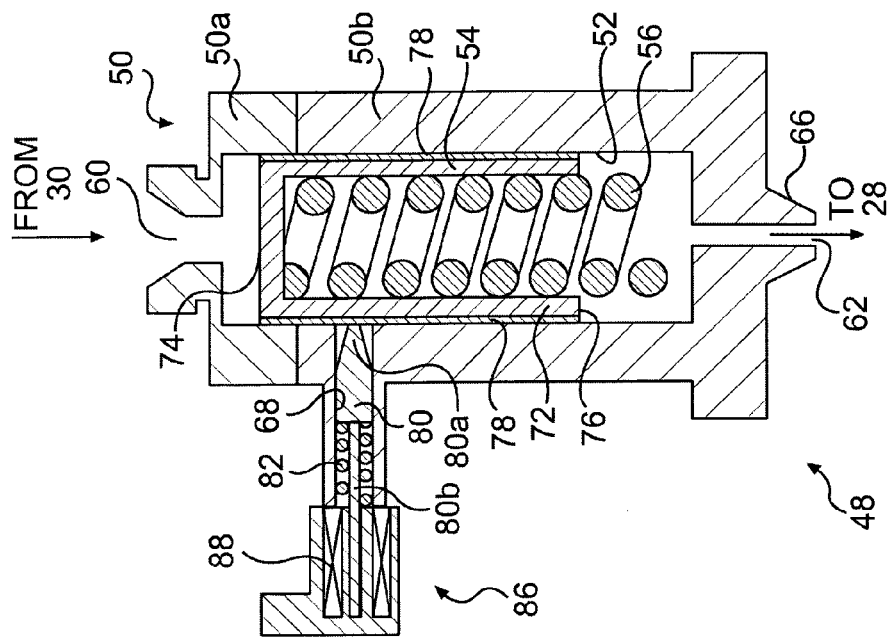
FIG. 4 is a cross-sectional illustration of the fuel leak limiter of FIG. 2 shown in a third position.

Locking actuator 58 may include components that cooperate to inhibit the movement of piston 54 from the second flow-blocking position (FIG. 4) toward the flow-passing position (FIG. 3). Specifically, locking actuator 58 may include a locking pin 80 disposed within recess 68 of body 50, and a resilient member, for example a spring 82, located within recess 68 to bias locking pin 80 toward piston 54. A cap member 84 may close off one end of recess 68 and provide a surface against which spring 82 may compress during assembly. As piston 54 moves toward the second flow-blocking position (downward in FIGS. 2-4), closed end 70 may eventually move past an opening of recess 68 such that spring 82 urges locking pin 80 to extend out of recess 68 and at least partially into central bore 52. With locking pin 80 extended into central bore 52, as shown in FIG. 4, piston 54 may be inhibited from returning to the flow-passing position (FIG. 3).

Locking pin 80 may be a generally cylindrical member having a tip end 80*a* and a base end 80*b*. Tip end 80*a* may include a chamfer or a bevel such that, when locking pin 80 moves in a direction substantially orthogonal to the movement direction of piston 54 (i.e., when locking pin 80 at least partially extends into central bore 52) and engages closed end 70 of piston 54, the chamfer or bevel may engage closed end 70 and urge piston 54 toward and maintain piston 54 in the second flow-blocking position. Base end 80*b* may include an area of reduced diameter at least partially received internally by spring 82. In this configuration, base end 80*b* may act as a guide and/or retainer for spring 82.

Locking actuator 58 may be resettable. That is, without intervention, piston 54 may be unable to return to the flow-passing position from the second flow-blocking position, thereby rendering the associated fuel injector 28 inoperable. After servicing or replacement of the failed fuel injector 28, however, it may be desirable to reuse the same fluid leak limiter 48. In order to provide this reuse capability, locking actuator 58 may be resettable. To reset locking actuator 58, locking pin 80 may be moved against the bias of spring 82 back into recess 68 such that closed end 70 of piston 54 may return past the opening of recess 68 substantially unimpeded. In the embodiments of FIGS. 2-4, locking actuator 58 may be manually resettable. That is, locking pin 80 may be manually brought back into recess 68 and out of the way of piston 54. This may be accomplished either by removing cap member 84 and withdrawing spring 82 and locking pin 80 through the newly opened end of recess 68, or by accessing central bore 52 (either from inlet 60 or by separating first body member 50*a* from second body member 50*b*) and urging locking pin 80 from tip end 80*a* back into recess 68.

Figure 5:
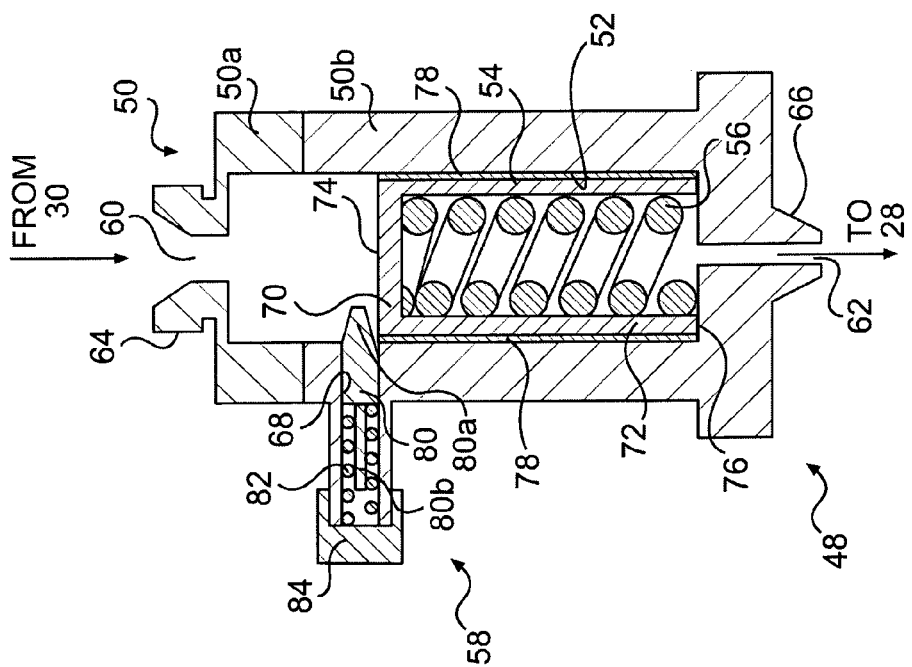
FIG. 5 is a cross-sectional illustration of another exemplary disclosed fuel leak limiter that may be used with the power system of FIG. 1 and shown in a first position.

In an alternative embodiment, shown in FIG. 5, fluid leak limiter 48 may include an electronic actuator 86. In this embodiment, piston 54 may still mechanically trigger locking pin 80 to lock piston 54 in the second flow-blocking position, as described above. However, locking pin 8Q may be reset electronically. That is, electronic actuator 86 may include an electrically driven device 88, for example a solenoid mechanism, a piezo mechanism, or another similar device associated with locking pin 80 that, when energized, withdraws locking pin 80 against the bias of spring 82 back into recess 68 and out of the way of piston 54. In one example, electrically driven device 88 or an additional sensing element (not shown) may also be used to generate a signal upon actuation of fluid leak limiter 48 (i.e., upon extension of locking pin 80 into central bore 52), if desired.

INDUSTRIAL APPLICABILITY

The fluid leak limiter of the present disclosure has wide application in a variety of engine types including, for example, diesel engines, gasoline engines, and gaseous fuel-powered engines. The disclosed fluid leak limiter may be implemented into any engine that utilizes a pressurizing fuel system having closed orifice-type fuel injectors where limitation of fuel leakage into associated combustion chambers after nozzle tip failure is desired.

Numerous advantages of the disclosed fluid leak limiter may be realized. For example, the disclosed fluid leak limiter may be capable of inhibiting fluid leakage caused by a variety of failure modes. That is, regardless of whether an associated fuel injector is leaking because of nozzle cracking, erosion, or complete breakaway, the disclosed fluid leak limiter may still function to block and thereby inhibit fuel leakage. And, the disclosed fluid leak limiter may be reusable. Further, the disclosed fluid leak limiter may provide an indication of actuation such that engine diagnostics may be enhanced.

It will be apparent to those skilled in the art that various modifications and variations can be made to the fluid leak limiter of the present disclosure without departing from the scope of the disclosure. Other embodiments will be apparent to those skilled in the art from consideration of the specification and practice of the fluid leak limiter disclosed herein. For example, although described and illustrated for use with a high-pressure fuel system, it is contemplated that the disclosed fluid leak limiter may be used with other high-pressure fluid systems, if desired. It is intended that the specification and examples be considered as exemplary only, with a true scope of the disclosure being indicated by the following claims and their equivalents.

What is claimed is:

1. A fluid leak limiter, comprising:
   a body at least partially defining a central bore and having a fluid inlet and a fluid outlet;

a piston reciprocatingly disposed within the central bore;
a spring located to bias the piston toward a first flow-blocking position at which fluid from the fluid inlet is inhibited from flowing to the fluid outlet; and
a pin configured to selectively lock the piston in a second flow-blocking position at which fluid from the fluid inlet is inhibited from flowing to the fluid outlet.

2. The fluid leak limiter of claim 1, wherein:
the piston is movable by a first pressure differential between the fluid inlet and the fluid outlet against the bias of the spring from the first flow-blocking position toward a flow-passing position at which fluid from the fluid inlet is allowed to flow to the fluid outlet;
the piston is movable by a second pressure differential between the fluid inlet and the fluid outlet against the bias of the spring from the flow-passing position toward the second flow-blocking position; and
each of the first and second pressure differentials is associated with a first pressure at the fluid inlet exceeding a second pressure at the fluid outlet.

3. The fluid leak limiter of claim 2, wherein the piston is a sleeve type piston having at least one external groove that facilitates passage of fluid from the fluid inlet to the fluid outlet when the piston is in the flow-passing position.

4. The fluid leak limiter of claim 2, wherein a duration of the second pressure differential is greater than a duration of the first pressure differential.

5. The fluid leak limiter of claim 2, wherein the first pressure differential is about equal to 0.375 MPa.

6. The fluid leak limiter of claim 2, wherein a flow rate of fluid through the central bore is about equal to 15-20 l/m when a pressure of the fluid is about 180 MPa and the piston is in the flow-passing position.

7. The fluid leak limiter of claim 2, wherein the pin is configured to extend at least partially into the central bore of the body after the piston has moved to the second flow-blocking position to inhibit return movement of the piston to the flow-passing position.

8. The fluid leak limiter of claim 1, wherein the pin is oriented to move in a direction substantially orthogonal to a movement direction of the piston.

9. The fluid leak limiter of claim 1, wherein the pin is spring-biased toward the piston.

10. The fluid leak limiter of claim 1, wherein the pin is resettable to allow substantially uninhibited movement of the piston.

11. The fluid leak limiter of claim 10, further including an actuator configured to electronically reset the pin.

12. The fluid leak limiter of claim 1, further including a sensing element associated with the pin and configured to generate a signal indicative of a locked status of the piston.

13. The fluid leak limiter of claim 1, wherein the pin includes a chamfer at an end thereof that engages the piston to urge the piston toward the second flow-blocking position.

14. A fluid leak limiter, comprising:
a body at least partially defining a central bore and having a fluid inlet and a fluid outlet;
a piston reciprocatingly disposed within the central bore;
a spring located to bias the piston toward a first flow-blocking position at which fluid from the fluid inlet is inhibited from flowing to the fluid outlet; and
an electronic locking actuator configured to lock the piston in a second flow-blocking position at which fluid from the fluid inlet is inhibited from flowing to the fluid outlet and to generate a signal indicative of a locked status of the piston.

15. The fluid leak limiter of claim 14, wherein:
the piston is movable by a first pressure differential between the fluid inlet and the fluid outlet against the bias of the spring from the first flow-blocking position toward a flow-passing position at which fluid from the fluid inlet is allowed to flow to the fluid outlet;
the piston is movable by a second pressure differential between the fluid inlet and the fluid outlet against the bias of the spring from the flow-passing position toward the second flow-blocking position; and
each of the first and second pressure differentials is associated with a first pressure at the fluid inlet exceeding a second pressure at the fluid outlet.

16. The fluid leak limiter of claim 15, wherein the second pressure differential has a greater duration than the first pressure differential.

17. The fluid leak limiter of claim 15, wherein the first pressure differential is about equal to 0.375 MPa.

18. The fluid leak limiter of claim 15, wherein a flow rate of fluid through the central bore is about equal to 15-20 l/m when a pressure of the fluid is about 180 MPa and the piston is in the flow-passing position.

19. The fluid leak limiter of claim 14, wherein the electronic locking actuator is mechanically triggered to lock the piston in the second flow-blocking position and electronically reset to allow substantially uninhibited movement of the piston.

20. A fuel system, comprising:
a pump configured to pressurize fuel;
a fuel injector configured to receive pressurized fuel from the pump; and
a resettable leak limiter situated between the pump and the fuel injector, the resettable leak limiter comprising:
a body at least partially defining a central bore and having a fluid inlet and a fluid outlet;
a piston reciprocatingly disposed within the central bore;
a spring located to bias the piston toward a first flow-blocking position at which fluid from the fluid inlet is inhibited from flowing to the fluid outlet and
a pin configured to selectively lock the piston in a second flow-blocking position at which fluid from the fluid inlet is inhibited from flowing to the fluid outlet.

21. A fuel system, comprising:
a pump configured to pressurize fuel;
a fuel injector configured to receive pressurized fuel from the pump; and
a resettable leak limiter situated between the pump and the fuel injector, the resettable leak limiter comprising:
a body at least partially defining a central bore and having a fluid inlet and a fluid outlet;
a piston reciprocatingly disposed within the central bore;
a spring located to bias the piston toward a first flow-blocking position at which fluid from the fluid inlet is inhibited from flowing to the fluid outlet; and
an electronic locking actuator configured to lock the piston in a second flow-blocking position at which fluid from the fluid inlet is inhibited from flowing to the fluid outlet and to generate a signal indicative of a locked status of the piston.

* * * * *